(12) United States Patent
Wittmeyer, Jr.

(10) Patent No.: US 7,182,667 B2
(45) Date of Patent: Feb. 27, 2007

(54) COLORING PAPER

(75) Inventor: Larry Wittmeyer, Jr., Lake Lotawana, MO (US)

(73) Assignee: Cardinal Brands, Inc., Lawrence, KS (US)

( * ) Notice: Subject to any disclaimer, the term of this patent is extended or adjusted under 35 U.S.C. 154(b) by 403 days.

(21) Appl. No.: 10/437,736

(22) Filed: May 14, 2003

(65) Prior Publication Data

US 2005/0014442 A1    Jan. 20, 2005

(51) Int. Cl.
*A63H 33/38* (2006.01)
*G09B 11/10* (2006.01)

(52) U.S. Cl. ........................................ 446/147; 434/84

(58) Field of Classification Search ................ 446/147, 446/148–150, 146; 434/88, 84, 81, 85; 281/51, 281/15.1; 283/85, 88–89
See application file for complete search history.

(56) References Cited

U.S. PATENT DOCUMENTS

| | | | |
|---|---|---|---|
| D7,962 S | 12/1874 | Lawrence | |
| 182,065 A | 9/1876 | Gilman | |
| 1,151,782 A | 8/1915 | Greeley | |
| 1,206,795 A | 12/1916 | Barrington | |
| 1,280,094 A | 9/1918 | Smith | |
| 1,503,837 A | 8/1924 | Lancaster | |
| 1,600,474 A | 9/1926 | Johnson | |
| 2,071,441 A * | 2/1937 | Varren | 434/88 |
| 3,939,588 A | 2/1976 | Hockaday | |
| 4,001,941 A | 1/1977 | Cruz | |
| 4,470,197 A | 9/1984 | Pagalies | |
| 4,600,393 A * | 7/1986 | Rosenwinkel et al. | 434/88 |
| 4,775,169 A | 10/1988 | Barth | |
| 4,798,537 A | 1/1989 | Ragouzis | |
| 4,884,826 A * | 12/1989 | Slagsvol | 281/2 |
| 4,986,573 A * | 1/1991 | Brunhoefer | 283/62 |
| 5,045,378 A | 9/1991 | Libby | |
| 5,234,344 A * | 8/1993 | Lenkoff | 434/84 |
| 5,269,691 A * | 12/1993 | Waldman | 434/429 |
| 5,286,286 A * | 2/1994 | Winnik et al. | 106/31.15 |
| 5,460,646 A * | 10/1995 | Lazzouni et al. | 106/31.34 |
| 5,569,317 A | 10/1996 | Sarada et al. | |
| 5,595,829 A * | 1/1997 | Pitts et al. | 428/537.5 |
| 5,611,958 A | 3/1997 | Takeuchi et al. | |
| 5,695,218 A * | 12/1997 | Nicosia | 281/38 |
| 6,149,719 A | 11/2000 | Houle | |

FOREIGN PATENT DOCUMENTS

AU    42541/72    7/1971

OTHER PUBLICATIONS

Clearpoint Paper Co.: CLEARPRINT "Fade-Out" pad brochure; Clearprint No. 1000H-10; undated.

* cited by examiner

*Primary Examiner*—Eugene Kim
*Assistant Examiner*—Alyssa M. Lowen
(74) *Attorney, Agent, or Firm*—Stinson Morrison Hecker LLP

(57) ABSTRACT

A coloring sheet, coloring book, coloring roll, and coloring desk and roll assembly having a coloring sheet with a printed coloring image outline on one surface is substantially visually imperceptible under normal viewing conditions, such as when viewed at a non-coloring distance using a standard incandescent light source, and a method of coloring the sheet. The image may be printed with ink extender, ultraviolet, or infrared ink, or printed opposite the coloring surface.

2 Claims, 2 Drawing Sheets

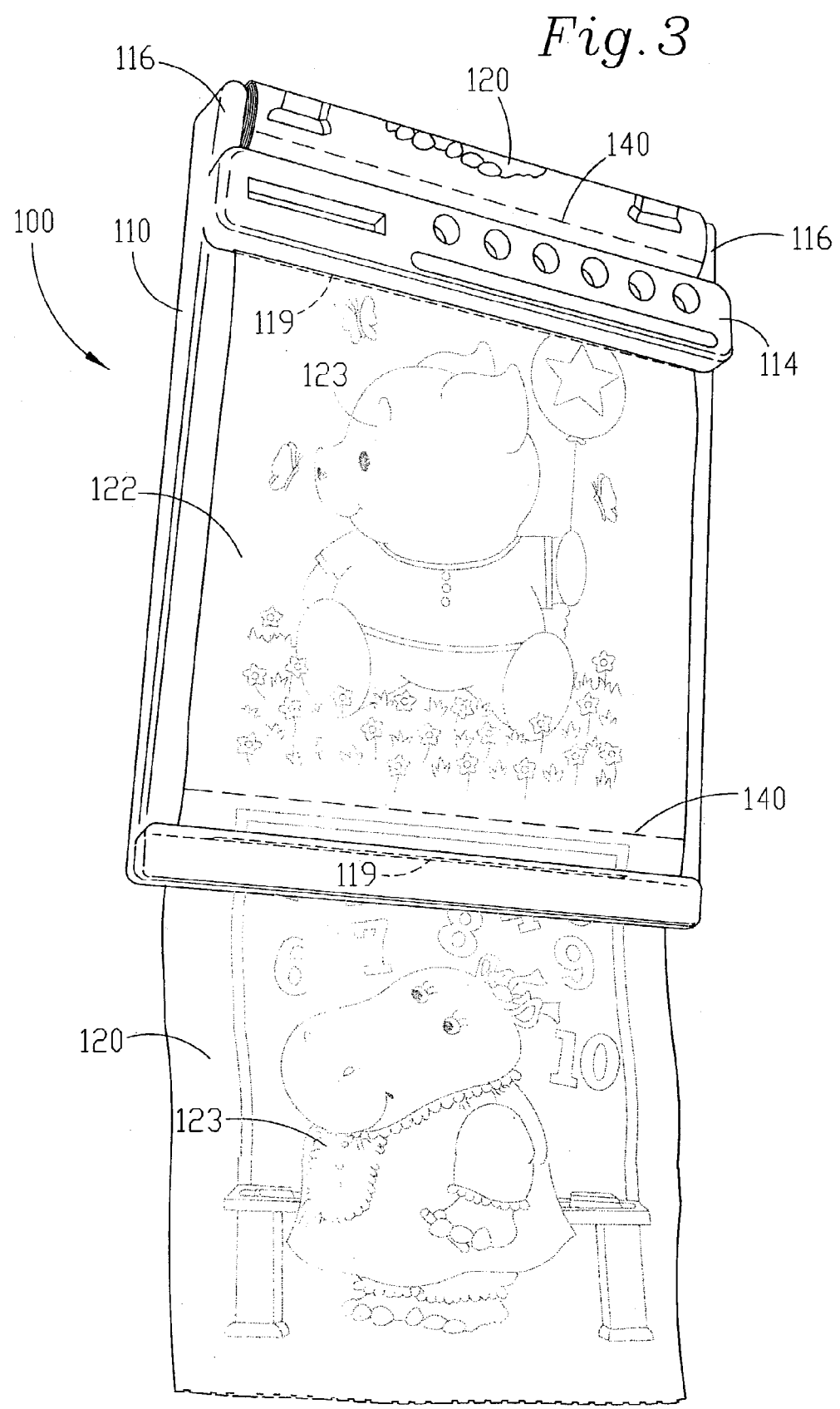

COLORING PAPER

CROSS-REFERENCE TO RELATED APPLICATIONS

Not Applicable.

STATEMENT REGARDING FEDERALLY SPONSORED RESEARCH OR DEVELOPMENT

Not Applicable.

1. Field of the Invention

The present invention is directed to coloring paper, and is more specifically directed to a coloring sheet having a coloring image that is relatively faint or otherwise substantially visually imperceptible under normal viewing conditions.

2. Description of Related Art

Conventional coloring paper comprises one or more printed images on a substrate with specific areas intended to be colored or painted by the user. Conventional coloring paper is usually incorporated into coloring books, coloring desk and roll assemblies, and the like. Various types of coloring books have long been known to those skilled in the art. More recently, "coloring desks" adapted to receive and hold rolls of coloring paper have been developed. Examples of such coloring desks include those manufactured by Wrebbit (e.g., the Cailou Refillable Coloring Desk), Family On Board (e.g., Color 'n Roll® Coloring Desk), Tara Toys (e.g., the Barbie Rolling Art Desk), and Colorama Creations (e.g., the Rolocolor Coloring Desk). The coloring roll has a series of printed images for coloring or painting.

In conventional coloring paper, the images are usually comprised of relatively wide dark black lines that form an outline to be colored. As a result, even after the coloring paper is colored, the dark outlines remain a prominent part of the overall colored image. In addition, it is clear to an observer that the colored image was not colored by freehand.

BRIEF SUMMARY OF THE INVENTION

An object of the present invention is to provide coloring paper which permits the colored artwork to appear to be colored free-hand to an observer.

Another object of the present invention is to provide a coloring desk and roll assembly using the coloring paper of the present invention.

The present invention is directed to a coloring sheet that may be used by itself or incorporated into a coloring book or coloring roll, wherein the coloring sheet has a coloring image that is substantially visually imperceptible when viewing the coloring surface of the sheet at a non-coloring distance using a white incandescent light source. In this manner, the coloring image is visible to the person coloring the paper, but substantially invisible to viewers of the paper that are a reasonable distance away, such as about an arm's length away. The net result is that the casual viewer more than about an arm's length away from the sheet cannot see the coloring image to an appreciable extent, such that it appears the colored image was created free hand.

The coloring image may be produced in a variety of ways. The image may be comprised of faint lines produced by printing the image on the coloring surface using an ink extender or by screening the coloring lines. The image may also be formed by printing the image on the surface opposite the coloring surface in a coloring book or roll so that it appears substantially imperceptible when viewing the coloring surface. In addition, the image may be comprised of a color that is substantially visually imperceptible when viewed using a standard white incandescent light source but is perceptible when viewed through a colored filter. The image may also be comprised of an "invisible ink," such as an ultraviolet or infrared ink that is only visually perceptible when exposed to an appropriate non-incandescent light source, such as an ultraviolet or infrared light source. The image may also be comprised of a "glow-in-the-dark" or phosphorescent ink.

BRIEF DESCRIPTION OF THE DRAWINGS

FIG. 3 is a perspective view of a coloring desk and coloring roll assembly in accordance with a preferred embodiment of the present invention.

DETAILED DESCRIPTION OF THE PREFERRED EMBODIMENTS

Figure 1:
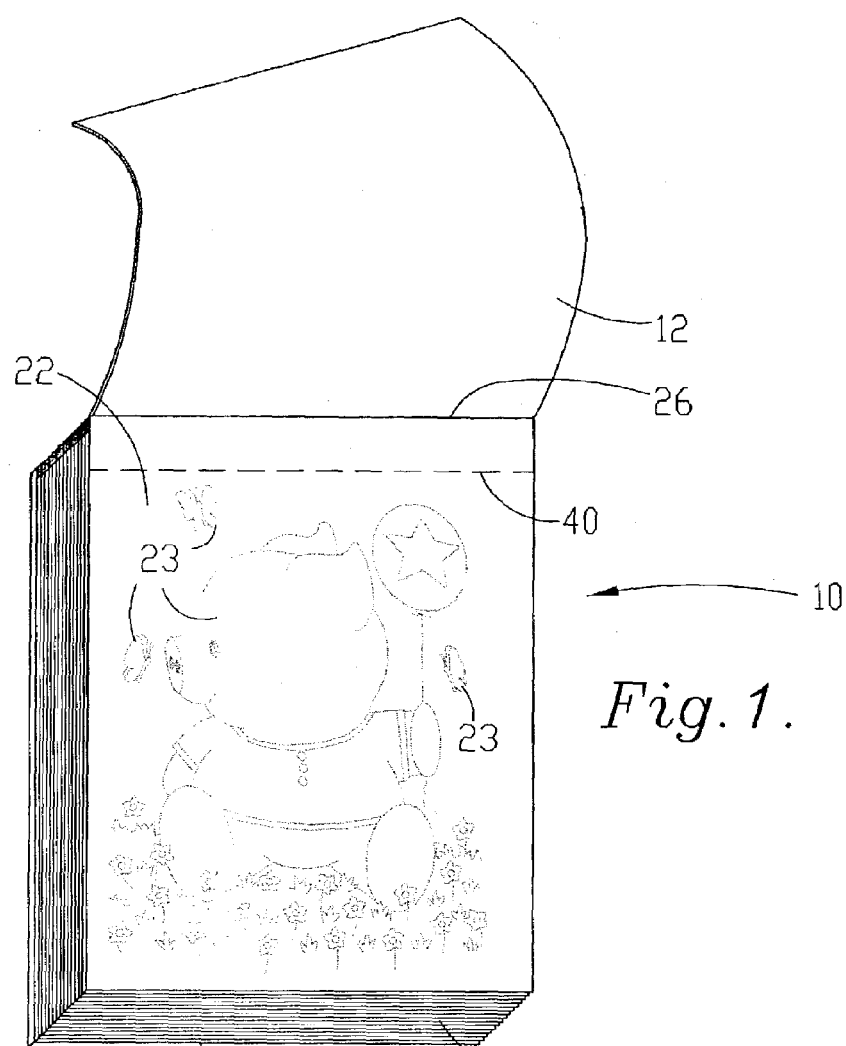
FIG. 1 is a perspective view of a coloring book having a coloring sheet in accordance with a preferred embodiment of the present invention.

A coloring book made in accordance with a preferred embodiment of the present invention is represented generally by the numeral 10 in FIG. 1. Coloring book 10 comprises a plurality of flat, planar coloring sheets 20. The coloring sheets may be formed of any suitable material for purposes of coloring and may be formed of a single layer of material or multiple layers (e.g. a laminate). Preferably, the coloring sheets are made of paper or other cellulose based materials. The coloring sheet may also include one or more coatings as is known in the art to improve the characteristics of the sheet and/or the coloring image. For purposes of this invention, the term "coloring" encompasses the application of color and/or graphics via any means known in the art including crayons, paint, chalk, colored pencils, charcoal and stickers.

Sheets 20 are bound to one another along a margin, preferably the top margin 26, to form a pad. Coloring book 10 also includes a top cover 12 (which is raised in FIG. 1) and bottom cover 14. Staples, adhesive, fasteners, or other book binding methods well known to those skilled in the art are used to secure the sheets to one another along the margin, and to secure the sheets to the top and bottom covers 12, 14. The coloring sheets and coloring book may be any suitable size or shape, but are preferably rectangular or square ranging in size from about 6 to 12 inches wide by about 8 to 20 inches long, and are more preferably about 8 inches wide by about 11 inches long.

To facilitate removal of a portion of sheet 20 from the pad, a separation line 40 is disposed adjacent top margin 26. This separation line may be formed by any means known in the art for enabling a portion of the sheet to be separated from the remainder of the sheet in a relatively easy manner and a clean straight line. Preferably, the separation line is formed by perforations or via die cut or laser cut lines of weakness as is known in the art.

Figure 2:
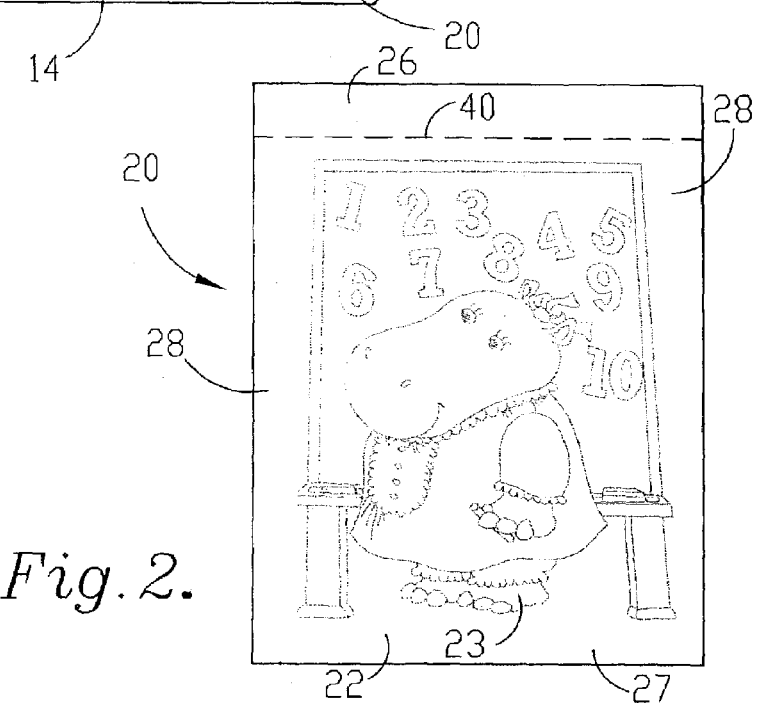
FIG. 2 is a top plan view of the coloring sheet shown in FIG. 1.

Looking to FIG. 2, coloring sheet 20 has a coloring surface 22, an opposite surface 24, a top margin 26, a bottom margin 27, and two side margins 28. A coloring image 23 is printed on at least one surface of sheet 20 and is substantially visually imperceptible when viewing coloring surface 22 at a non-coloring distance using a white incandescent light source.

A "non-coloring distance" means that the viewer is more than about an arm's length from the surface having the image printed thereon such that the viewer cannot color the image because the viewer is too far away. Typically, the non-coloring distance is greater than about 18 inches, and is usually about 24 to 36 inches. A "white incandescent light source" means a conventional white light bulb having a tungsten filament that is housed inside a glass sphere. Suitable incandescent bulbs are available in various sizes including "60 watt," "75 watt," and "100 watt" and may be purchased from a variety of sources including the General Electric Company.

Although the coloring image 23 is illustrated in the figures with a "grey line" in order to depict the image as being lighter than conventional coloring images, it will be appreciated that the image is not actually grey but is instead substantially visually imperceptible when viewed at a non-coloring distance using a white incandescent light source.

The coloring image 23 may be printed on the coloring surface 22, on the opposite surface 24, or on both surfaces 22, 24. More specifically, it is possible to print the coloring image 23 on the coloring surface 23 so it is substantially visually imperceptible when viewing the coloring surface 22 at a non-coloring distance using an incandescent white light source and to print a second coloring image (not shown in the drawings) on the opposite surface 24 so that the second coloring image is substantially visually imperceptible when viewing the opposite surface at a non-coloring distance using an incandescent white light source.

In one embodiment of the present invention, coloring image 23 comprises faintly visible coloring lines printed on coloring surface 22. These faint lines are visually perceptible at a coloring distance away from the paper (usually less than about 18 inches, and preferably at about 6 to 12 inches), but are substantially imperceptible at a non-coloring distance away from the paper. In other words, the printed coloring image is visible to the person coloring the paper, but substantially invisible to viewers of the paper that are a reasonable distance away, such as about an arm's length away. The net result is that the coloring image 23 "disappears" from view except under close and careful scrutiny. The casual viewer more than about an arm's length away from the paper cannot see the coloring image to an appreciable extent.

The faintly visible coloring lines of the coloring image 23 may be achieved using a variety of methods well known to those skilled in the art. In one embodiment, the faint visible coloring lines are produced by using ink extender. Although the ink extender may be mixed with a suitable ink (e.g., an ink having a black or bluish hue and the like), the paper is preferably printed solely with ink extender. A preferred ink extender is commercially available from Water Ink Technologies (Charlotte, N.C.) under Product No. WVG000101. The resulting faintly visible coloring lines generally create a "water-marked" image. It will be appreciated that numerous methods of producing such "water-marked" images are known to those skilled in the art.

Alternatively, the faintly visible coloring images are achieved as generally set forth in Pitts et al., U.S. Pat. No. 5,595,829, which is incorporated herein by reference. More specifically, the image 23 may be produced by preparing the printing plate by exposure behind about 3 to 30% screen, and preferably a 5 to 10% screen. Thus, only about 5 to 10% of the exposure is preferably applied to the plate that would normally be applied to achieve dark lines. Then, the coloring surface 22 of the paper is printed with a suitable ink. The ink is preferably composed of a 50/50 mixture of PMS silver (Pantone® 877) and opaque white. This color of ink, printed with the about 5 to 10% exposed plate, results in the desired visual character of the coloring image.

When the faintly visible coloring image 23 is made using ink extender or by screening the coloring lines, the faintly visible coloring image is best seen by placing a dark sheet of paper (not shown) underneath sheet 20 (i.e., against the opposite surface 24). Thus, the sheet 20 is preferably thin enough so that the dark paper enhances the viewer's perception of the faintly visible coloring image 23 when placed underneath sheet 20.

In another embodiment, coloring image 23 is achieved by printing the coloring image 23 on the opposite surface 24 of the paper and incorporating sheet 20 into a coloring book such that the coloring surface is presented face up for use. In this instance, coloring surface 22 is preferably substantially free of markings in the areas corresponding to where the coloring image 23 is printed on the opposite surface 24 so as to not interfere with viewing the image 23 when coloring the paper. When viewing the coloring surface 22 at a non-coloring distance, the coloring image 23 on the opposite surface 24 is substantially visually imperceptible. However, when viewing the coloring surface 22 at a distance for coloring the image (about an arm's length away or less), the coloring image 23 is visibly perceptible through the paper. It will be appreciated that in this embodiment, the placement of a dark sheet of paper underneath the paper 20 (i.e., against the opposite surface) will interfere with viewing the coloring image 23.

When the coloring book is produced by printing coloring image 23 on opposite surface 24 for coloring on the coloring surface 22, the book is preferably printed with or is accompanied by instructions which indicate that the coloring surface 22 is to be colored. These instructions, for example, may be in the margin of the coloring surface 22 or may be in the packaging for the book.

In another embodiment, the printed coloring image 23 which is substantially visually imperceptible at a non-coloring distance using a white incandescent light source is produced by printing coloring surface 22 with a color that is visibly enhanced when subjected to a colored light source or filter. Preferably, the printed coloring image is comprised of a yellow ink that is substantially visually imperceptible at a non-coloring distance using a white incandescent light source but is readily perceptible when the yellow image is viewed using a blue light source or filter. Suitable yellow inks include Pantone® yellow or process yellow. The blue filter is preferably comprised of a thin plastic that is fashioned into viewing glasses (not shown) such that the filter comprises the lenses of the glasses. Alternatively, the yellow inks can become perceptible when the inks are viewed using a "blue" bulb—i.e., a light bulb that emits primarily a blue color.

In yet another embodiment, coloring image 23 is produced using an invisible ink on coloring surface 22. Invisible inks are traditionally defined to involve a broad class of ink formulations which cannot be seen by the unaided eye when applied to a substrate and viewed with "natural" light (e.g., light from the sun) or light from conventional white incandescent lamps and the like. These light forms (as well as other forms which are normally used for general illumination purposes in homes, businesses, and the like) are collectively characterized as "white" light which involves a combination of all the various colored light fractions which fall within a wavelength range of about 300–700 mm. Under these illumination conditions, the ink compositions are essentially colorless. Only after illumination with other light wavelengths outside the visible spectrum do the printed coloring images become visible to the observer.

A number of invisible inks that are commercially available, many of which are responsive to ultraviolet light or infrared range. See, e.g., U.S. Pat. No. 5,569,317 (ultraviolet) and U.S. Pat. Nos. 5,611,958 and 5,766,324 (infrared). The present invention preferably uses a so-called ultraviolet ink that fluoresces when subjected to an ultraviolet light source (such as a "black light"). Such ultraviolet markings used in conjunction with ultraviolet light provide a dramatic effect, since the coloring image, which is originally seemingly invisible in visible or normal light, becomes brightly fluorescent and visible under ultraviolet radiation. A preferred ultraviolet ink is commercially available from Craig Adhesives (Newark, N.J.) as Product No. 6933N2.

In another embodiment, coloring image 23 may be produced using a phosphorescent ink on the coloring surface 22. In general, such phosphorescent inks are substantially invisible in normal lighting conditions but "glow in the dark" after an illuminating source has been removed because the atoms remain in an excited state. A preferred phosphorescent ink is commercially available from Craig Adhesives under Product No. 89108A.

It will be appreciated that coloring image 23 may be of any desirable or fashionable form (such as a tree, rabbit, Power Ranger®, or Pokemon® character) known to those skilled in the art. It will also be appreciated that the coloring image may include both solid outlined images (such as those shown in FIG. 2), color-by-number, or paint-by-number images. In addition, coloring images in which the image is "colored" by placing an adhesive sticker having a desired design or color onto the sheet as outlined by the coloring image 23 are within the scope of the present invention.

Once colored, the colored image generally appears to be drawn free-hand because the image outline is substantially imperceptible to those viewing the image at a non-coloring distance with a standard white incandescent light source. It will be appreciated that the lines themselves may be colored to further the impression that the image was drawn free-hand when viewed at both a coloring distance and non-coloring distance.

It should be understood that the coloring image of the present invention, namely a coloring image that is substantially visually imperceptible at a non-coloring distance using a white incandescent light source may be utilized in conjunction with any type of coloring sheet, coloring book, coloring roll or the like requiring a graphic or image for coloring. In a preferred embodiment, the coloring image of the present invention may be used as the coloring image or the sticker image disclosed in Applicant's co-pending patent application Ser. No. 10/438,227 entitled "Coloring Paper Having Adhesive" filed on the same date of this application, which co-pending application is incorporated herein in its entirety.

Another embodiment of the coloring sheet in accordance with the present invention is shown in FIG. 3. In this embodiment, the coloring sheet is in the form of a roll 120 utilized in a coloring desk and roll assembly 100. Roll 120 comprises a roll of sheet like material suitable for purposes of coloring and is preferably formed of paper or other cellulose based materials. The roll may comprise a single layer or multiple layers of material and may be coated as is known in the art to improve certain characteristics of the roll and/or coloring image. Roll 120 has one or a series of printed coloring images 123 thereon. The printed coloring image 123 is substantially visually imperceptible when viewed at a non-coloring distance using a white incandescent light source as discussed above. The coloring image 123 may be one long continuous image or a series of separate periodically spaced images.

The exemplary coloring desk 110 shown in FIG. 3 is manufactured by Rose Art Industries., Inc, but those skilled in the art will recognize that various other desks may be used with the coloring paper of the present invention. The portable desk 110 includes a substantially planar coloring surface, a coloring instrument organizer, and at least one coloring roll receiving portion 116. The coloring roll receiving portion includes two projections (not shown) which extend from the inner surface of the sides of the desk 110. These projections removably engage the coloring roll so that portions of the roll can be dispensed onto the coloring surface through one or more openings 119 as desired.

As shown in FIG. 3, the coloring roll 120 of present invention has an extended coloring surface 122. The coloring roll preferably has a length of about 12 to 40 feet, more preferably about 16 to 20 feet, and a width of about 4 to 16 inches, even more preferably about 11 inches., To facilitate removal of a portion of the roll 120, separation lines (such as a perforation line) 140 are periodically disposed along the roll 120. The separation lines are preferably located between each of the series of printed coloring images 123 (e.g., between the hippopotamus and pig printed coloring images shown in FIG. 3).

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A method of coloring a coloring sheet having a coloring image outline comprising:

providing a coloring sheet having a coloring image outline printed on a coloring surface that is substantially visually imperceptible when viewing the coloring surface at a non-coloring distance using an incandescent white light source;

wherein said coloring image outline is comprised of faintly visible coloring, lines that are substantially visibly imperceptible at a non-coloring distance and further comprising the step of placing a dark sheet of paper underneath said coloring sheet to enhance the visibility of the coloring image outline when coloring; and coloring the coloring image outline on the coloring surface.

2. A method of coloring a coloring sheet having a coloring image outline comprising:

providing a coloring sheet having a coloring image outline printed on a coloring surface that is substantially visually imperceptible when viewing the coloring surface at a non-coloring distance using an incandescent white light source;

wherein said coloring image outline is printed with a yellow ink and further comprising the step of viewing the coloring image outline through a blue filter when coloring; and coloring the coloring image outline on the coloring surface.

* * * * *